US005696480A

United States Patent [19]
Hirai

[11] Patent Number: 5,696,480
[45] Date of Patent: Dec. 9, 1997

[54] COMMUNICATIONS APPARATUS FOR PREVENTING AN ADVERSE EFFECT ON A PROCESSING ANALOG SIGNAL PRODUCED AT A LOOP CONNECTION TIME DUE TO CHARGING/DISCHARGING

[75] Inventor: Renzou Hirai, Tokyo, Japan

[73] Assignee: Kabushiki Kaisha Toshiba, Kawasaki, Japan

[21] Appl. No.: 491,570

[22] Filed: Jun. 16, 1995

[30] Foreign Application Priority Data

Jun. 17, 1994 [JP] Japan .................................... 6-135925

[51] Int. Cl.$^6$ .................................................... H04M 11/04

[52] U.S. Cl. ................................ 340/310.01; 340/310.06; 340/310.08; 323/273

[58] Field of Search ......................... 340/310.01, 310.06, 340/310.07, 310.08, 870.38, 825.71, 825.72; 323/273, 280; 363/21, 97; 455/4.1, 5.1

[56] References Cited

U.S. PATENT DOCUMENTS

| | | | |
|---|---|---|---|
| 4,206,397 | 6/1980 | Dahlke | 323/22 T |
| 4,242,665 | 12/1980 | Mate | 340/870.38 |
| 4,331,912 | 5/1982 | Ruesch et al. | 323/271 |
| 4,751,495 | 6/1988 | Whitman | 340/310.01 |
| 4,804,958 | 2/1989 | Longdorf | 340/870.38 |
| 5,210,519 | 5/1993 | Moore | 340/310.06 |
| 5,227,762 | 7/1993 | Guidette et al. | 340/310.01 |
| 5,451,923 | 9/1995 | Seberger et al. | 340/310.01 |
| 5,455,503 | 10/1995 | Kohler | 323/273 |
| 5,491,402 | 2/1996 | Small | 340/310.08 |

*Primary Examiner*—Brent A. Swarthout
*Assistant Examiner*—Van T. Trieu
*Attorney, Agent, or Firm*—Oblon, Spivak, McClelland, Maier & Neustadt, P.C.

[57] ABSTRACT

A communications apparatus is disclosed which, through a transmitter loop, can conduct two-way communication with a field device. The communications apparatus comprises a branching loop connected in parallel with a load resistor inserted in the transmitter loop, a time constant circuit comprising a capacitor and resistor provided in the branching loop, a switch short-circuiting the resistor in the time constant circuit, and a communication unit receiving, as communication data from the field device, an AC signal component passed through the capacitor and, after an AC signal representative of communication data to allow communications with the field device is applied to the branching loop, superimposing AC signal on an analog signal flowing in the transmitter loop.

17 Claims, 5 Drawing Sheets

COMMUNICATIONS APPARATUS FOR PREVENTING AN ADVERSE EFFECT ON A PROCESSING ANALOG SIGNAL PRODUCED AT A LOOP CONNECTION TIME DUE TO CHARGING/DISCHARGING

BACKGROUND OF THE INVENTION

1. Field of the Invention

The present invention relates to an apparatus for making communication with a field device at a site in a processing controller of a plant and, more in particular, to a communications apparatus of a type allowing communication information to be superimposed on a processing signal.

In the processing control of a plant, a larger number of sensors (field devices) are arranged to detect various kinds of amounts of processing, such as a pressure and a flow, at various sites in the plant. A control monitor installed at a center receives various signals transmitted from these sensors and utilizes them for the controlling/monitoring of processing amounts involved.

At present, those signals used for the transmission of processing amount data from the sensors to the monitors are mainly an analog current version of a direct current 4 to 20 mA. The AC signal with digital signals superimposed thereon is used for two-way communications between the sensors and communications apparatus (master unit). Sensor parameters, such as range and a zero-point adjustment, from the communications apparatus are remotely set/changed to the sensors or the maintenance information, such as a tag number, material information of a portion contact with a liquid, a previous maintenance/checking date, are read from the sensors onto the communications apparatus. A portable communications apparatus called a handheld terminal is known as this type of communications apparatus. FIG. 7 shows a state in which the handheld terminal is connected to a transmitter loop. Typically, the transmitter loop of a processing controller comprises a closed circuit including a power source 1, a transmitter 2 and a load resister 3. The analog signal representing a processing amount is forwarded to the transmitter loop and leads to a load resistor 3 in the form of a voltage.

At the time of maintenance and checking, the handheld terminal 4 is carried to a location including a connection terminal of the transmitter loop and, after being connected across the load resister 3 and a predetermined operation, such as the calibration operation of the transmitter, is carried out, is disconnected from the transmitter loop and carried away from that location.

FIG. 8 shows a state in which a conventional handheld terminal 4 is connected through an interface (I/F) circuit 5 to a transmitter loop. The I/F circuit 5 inhibits a DC component of an analog signal representing a processing state and allows the passing of an AC signal (communication signal) superimposed on the analog signal. A communications controller 6 inputs the AC signal component, which is passed through the I/F circuit 5, as a decoded form to a CPU 7. Further, in the case where a communication signal is to be sent from the handheld terminal 4 to the transmitter 2, the communication signal coming from CPU 7 is coded by the communications circuit 6 and inputs it to the I/F circuit 5. The communication signal is super-imposed on the analog signal flowing in the transmitter loop from the I/F circuit 5.

The handheld terminal 4 includes a data key-in circuit 8, a memory 9, a display section such as an LCD, and a power source 11.

FIG. 9 shows a practical form of the I/F circuit 5. Generally, the I/F circuit 5 is of such a combined structure as to include a capacitor 12 for eliminating a DC component and a transformer 13 for achieving insulation between the capacitor 12 side and the CPU 7 side.

When the I/F circuit 5 as shown in FIG. 9 is connected to the transmitter loop, the capacitor 12 is charged temporarily (for example, below 1 second) and a charging current is generated. There is a high possibility that a variation of the charging current will exercise an influence over the analog signal in the transmitter loop.

Further, in the case where the handheld terminal 4 is disconnected from the transmitter loop of the field device and then connected to another transmitter loop, a discharge occurs, that is, an electric current flows from the I/F circuit 5 into the transmitter loop if a voltage on areas of connection to another transmitter loop differs from a voltage on the capacitor 12. A variation of the discharging current is also superimposed on the analog signal flowing in the transmitter loop.

There is a possibility that, if the charging/discharging current reaches a not-negligible extent against an analog signal flowing in the transmitter loop, an error of measurement will occur due to the charging/discharging current. Since a lowpass filter of usually about a few tens of ms is inserted in an input stage of a receiving meter which takes an analog signal in the transmitter loop as a detected signal corresponding to a processing amount, the charging current (discharging current) can often be disregarded as a temporary phenomenon.

Since, however, the time constant of the lowpass filter at the input side of the receiving meter cannot be made great on a system calling for a high-speed response, there is a possibility that a variation of an analog signal resulting from a charging or a discharging current will be erroneously judged as a processing variation. If, in particular, the communications are to be made on an automatic-controlled transmitter loop, there is a possibility that such automatic control will be adversely influenced when the handheld terminal is connected to the transmitter loop.

In this way, the communications apparatus equipped with a capacitor for cutting off a DC component of an analog signal involves a possibility that, when such connection is made to the transmitter loop, an error of measurement will occur on the receiving meter side due to an adverse influence exerted, by a charging/discharging current in the I/F circuit, on an analog signal flowing in the transmitter loop.

SUMMARY OF THE INVENTION

It is accordingly the object of the present invention to provide a communications apparatus which exerts no adverse influence on an analog signal flowing in a transmitter loop when it is connected to the transmitter loop.

According to the present invention, there is provided a communications apparatus which, through a transmitter loop into which a field device sends an analog signal corresponding to a processing amount, conducts communication with the field device with an AC signal, representative of communications data, superimposed on the analog signal and, after an AC signal component superimposed on the analog signal has been separated from the analog signal flowing in the transmitter loop, receives the AC signal component as communication data from the field device, comprising:

- a branching loop connected in parallel with a load resistor inserted in the transmitter loop and branching the analog signal flowing in the transmitter loop;
- a capacitor inserted in the branching loop to allow inhibition of a DC signal component in the analog signal branched from the transmitter loop into the branching loop and passage of an AC signal component in the analog signal;

a charging/discharging controlling section for controlling a charging current produced through the charging of the capacitor and a discharging current produced through the discharging of the capacitor; and a communications unit for receiving the AC signal component, which is passed through the capacitor, as the communication data from the field device and for applying to the branching loop the AC signal representative of the communication data to allow communication with the field device and superimposing the AC signal on the analog signal flowing in the transmitter loop.

For the communications apparatus according to the present invention it is possible to suppress a charging current or discharging current, by a charging/discharging controlling unit, produced through the charging or discharging of the capacitor when the branching loop is connected to the transmitter loop. As a result, there is almost no adverse effect on an analog signal flowing in the transmitter loop.

With the communications apparatus, the charging/discharging controlling unit comprises a resistor inserted in series array into the branching loop, a bypass circuit connected in parallel with the resistor, and a switch provided in the bypass circuit.

In the communications apparatus equipped with the charging/discharging unit, the capacitor and resistor constitute a time constant circuit. When the communications apparatus is connected to the transmitter loop of the field device with the switch open, the current branched from the transmitter loop passes through the time constant circuit. The capacitor of the time constant circuit starts its charging (discharging) by its current. Since, however, the current above is restricted by the resistor, it exerts almost no adverse effect on an analog signal flowing in a signal line.

Further, the amplitude of a communication signal is attenuated on the passing through the resistor and, if the resistor is short-circuited by the associated switch after the charging or discharging of the capacitor has been completed, it is possible to prevent attenuation in amplitude of a communication signal.

The communications apparatus as set out above can be equipped with a comparator for comparing the voltage on the capacitor and the predetermined reference voltage and delivering a "connected" signal representing a connection to the transmitter loop when the capacitor's voltage and reference voltage coincide with each other and a "not connected" signal representing no connection signal when the capacitor voltage and reference voltage do not coincide in a predetermined range.

According to the communications apparatus, it is judged, through the monitoring of the capacitor voltage, whether or not the apparatus is connected to the transmitter loop for transmitting an analog signal. The capacitor, being provided in the connection area of the transmitter loop for transmitting an analog signal, takes on substantially the same voltage as that on the connection area in the case where it is connected to the transmitter loop. It is, therefore, possible to detect a connection and no connection to the transmitter loop through monitoring of a voltage across the capacitor above.

The communications apparatus can include a connection terminal voltage detection unit for detecting a voltage on the connection areas between the branched loop and the transmitter loop, a charging/discharging circuit for allowing the charging/discharging of the capacitor so as to make a detected voltage on the connection terminal detection unit and capacitor voltage equal to each other, and a communication switch inserted in the branching loop.

According to the communications apparatus, a voltage on connection areas of a signal line for transmitting an analog signal is monitored and the capacitor is charged/discharged so as to make the capacitor voltage and voltage on the connection areas equal to each other. In the case where the capacitor voltage and voltage on the connection areas are made equal to each other, it is possible to prevent an adverse effect on the analog signal which might otherwise occur when the branching loop and transmitter loop are connected to each other.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the present invention will be explained below as being applied to a handheld terminal.

First Embodiment

Figure 1:
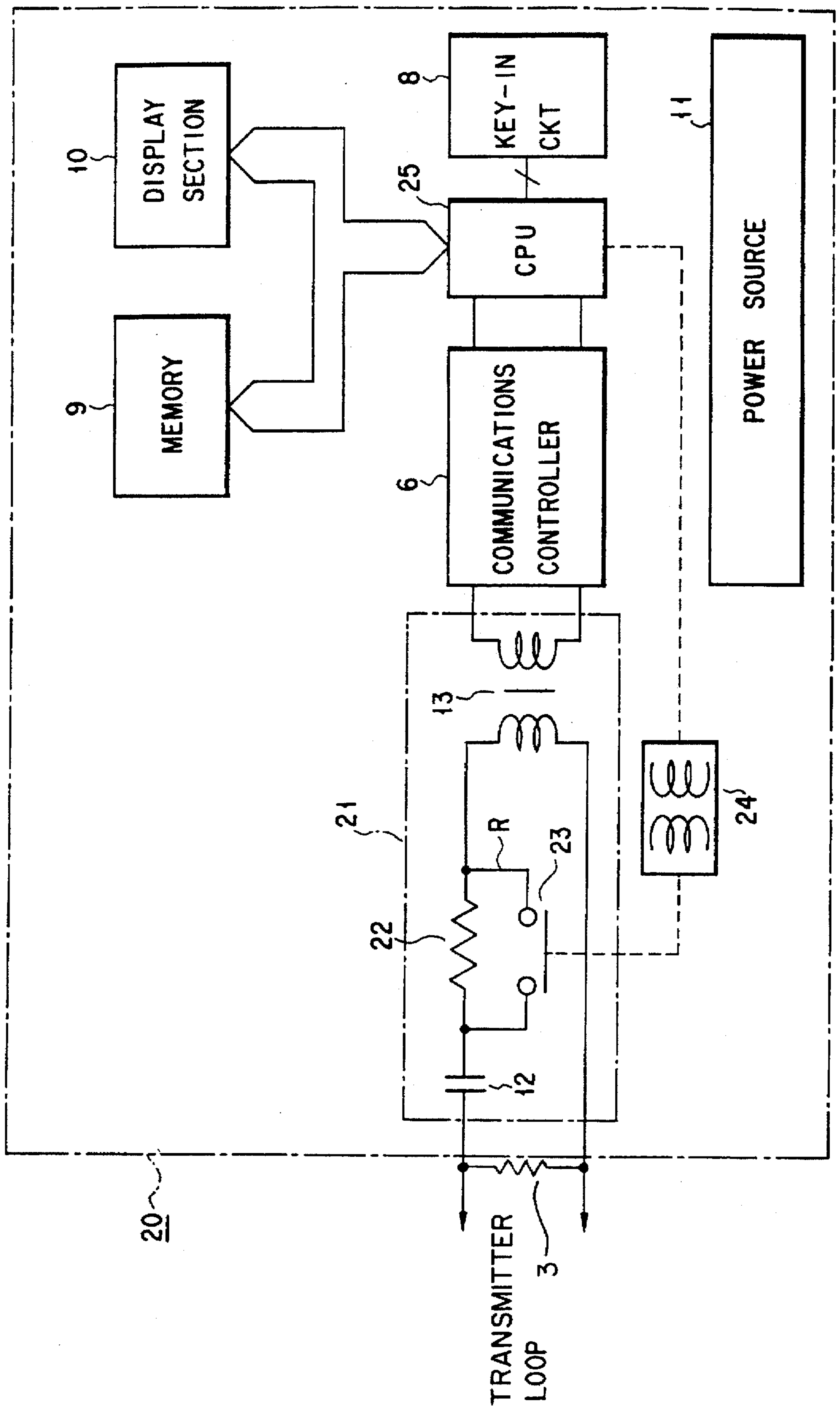
FIG. 1 is a schematic diagram showing a handheld terminal according to a first embodiment of the present invention.
Figure 8:
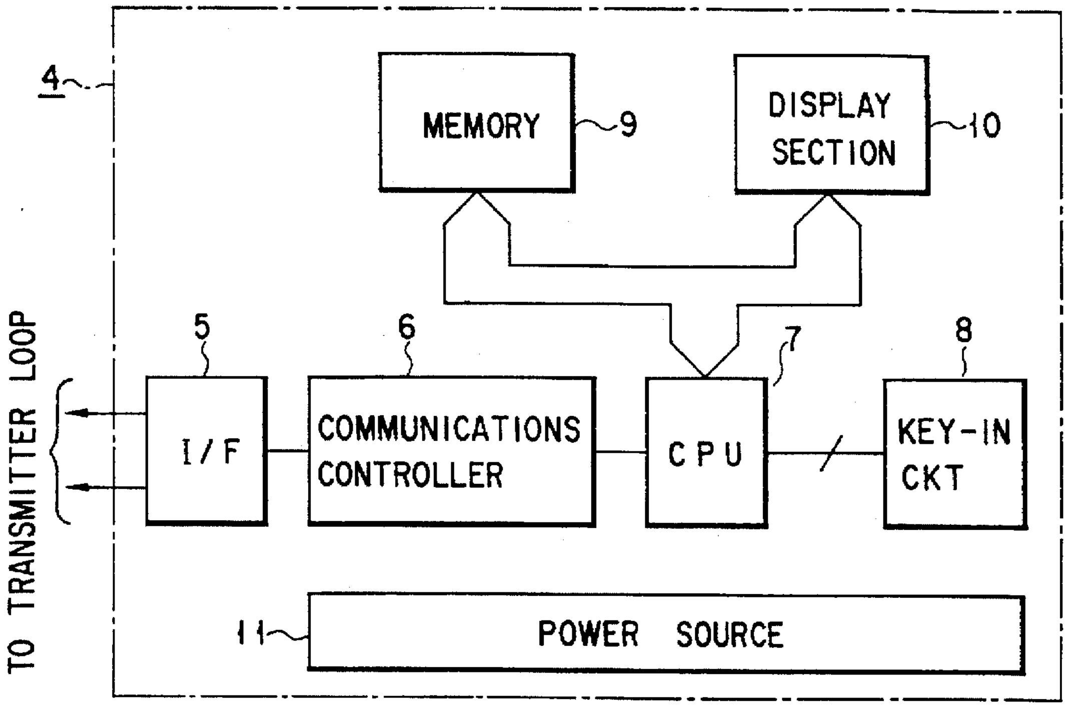
FIG. 8 PRIOR ART
FIG. 8 is a schematic diagram showing a conventional handheld terminal.
Figure 9:
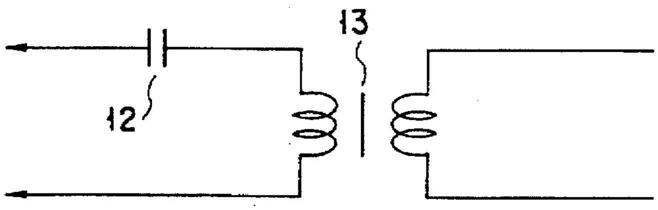
FIG. 9 PRIOR ART
FIG. 9 is a schematic diagram of an I/F circuit provided in a conventional handheld terminal.

FIG. 1 shows a functional block diagram of a handheld terminal according to the present invention. The same reference numerals are employed in FIG. 1 to designate parts or elements corresponding to those shown in FIG. 8.

A handheld terminal 20 of the present embodiment is equipped with an I/F circuit 21 adapted to take out an AC signal component superimposed on an analog signal flowing in a transmitter loop and to superimpose a communication signal on the analog signal flowing in the transmitter loop. The I/F circuit 21 comprises a capacitor 12 for preventing a DC component corresponding to an analog signal representing a processing amount and a transformer 13 for achieving insulation between the transmitter loop and the inside of the handheld terminal.

The capacitor 12 is connected between a terminal connected to one end of a load resistor 3 of the transmitter loop and one end of a primary-side coil of a transformer 13. A resistor 22 is connected in series between the capacitor 12 and the primary-side coil of the transformer 13. A bypass circuit R is connected across the resistor 22 and a switch 23 is inserted in the bypass circuit R. A control terminal for effecting ON/OFF control of the switch 23 is connected to a CPU 25 through an insulating circuit 24. In the present embodiment, the insulating circuit 24 is comprised of a transformer.

The operation of the present embodiment will be explained below.

The switch 23 is set in an open state before the handheld terminal 20 is connected to the transmitter loop. Before such a connection, for example, an instruction is entered at a key-in circuit 8 to enable CPU 17 to set the switch 23 in an open state.

With the switch 23 in the open state, the handheld terminal 20 is connected to the transmitter loop. With the handheld terminal 20 connected to the transmitter loop, if a charging voltage of the capacitor 12 is lower than a voltage on connection areas between the transmitter loop and the handheld terminal, a current branched from the transmitter loop flows in an I/F circuit 21 to allow its DC component to be charged into the capacitor 12.

With the handheld terminal 20 connected to the transmitter loop, if a charging voltage of the capacitor 12 is higher than a voltage on the areas of connection to the transmitter loop, the capacitance 12 is discharged to allow a discharge current to flow in a path including the capacitance 12, load resistor 3 in the transmitter loop, primary-side coil in the transformer 13 and resistor 22.

Here, the analog signal in the transmitter loop is affected by the charging/discharging current. Since, however, the peak level of the charging/discharging current is restricted by the resistor 22, the analog signal is less influenced thereby. That is, the peak level of the charging/discharging current can be restricted, by the proper selection of the resistive value of the resistor 22, to an extent to which an adverse influence on the receiving meter side can be disregarded.

After the connection operation has been completed between the handheld terminal 20 and the transmitter loop, the switch 23 is closed to create a bypass path relative to the resistor 22. For example, an instruction is input from the key-in circuit 8 to enable CPU 25 to set the switch 23 in a closed state. This state is maintained during communication.

As a result, a current flows from the transmitter loop to the handheld terminal through the capacitor 12, bypass circuit R and transformer 13. That is, the current flows via the bypass circuit R. Since the DC component of an analog signal flowing in the I/F circuit 21 is accumulated in the capacitor 12, an AC signal component superimposed on the analog signal as a communication signal component emerges on a secondary-side coil of the transformer 13. The AC signal component on the secondary-side coil of the transformer 13 is input as the communication signal component to CPU 25 through the communication controller 6. During communication, the AC component superimposed on the analog signal can be used, for communication, with the switch 23 in the closed state and hence the bypass circuit created relative to the resistor 22 and can be done so without being attenuated by the resistor 22.

According to the present embodiment, the resistor 22 is provided on the path of the charging current or discharging current resulting from the charging or discharging of the capacitor 12 and, by doing so, the peak level of the charging current or discharging current is restricted. It is, therefore, possible to suppress an adverse influence exerted by the charging current or discharging current on the analog signal, when the handheld terminal 20 is connected to the transmitter loop, and hence to enable communication to be conducted with requisite communication signals even in the transmitter loop now in use for control, etc., without being adversely influenced on a control system.

Although in the above-mentioned embodiment the switch 23 is controlled by CPU 25, it may be manually opened or closed.

Second Embodiment

Figure 2:
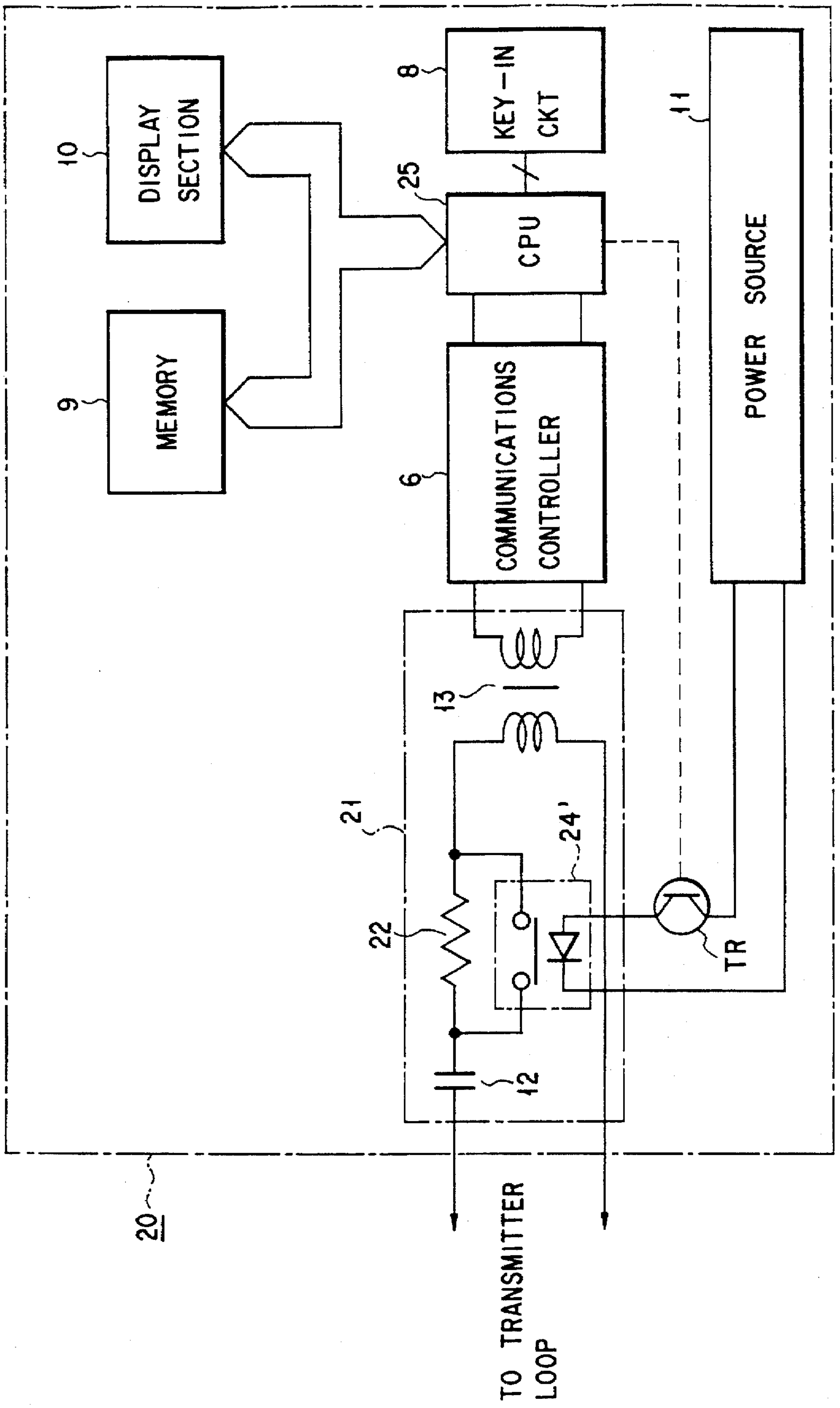
FIG. 2 is a schematic diagram showing another handheld terminal according to a second embodiment of the present invention.

FIG. 2 shows a functional block diagram of a handheld terminal according to a second embodiment. The same reference numerals are employed in FIG. 2 to designate parts or elements corresponding to those shown in the first embodiment above.

In the present embodiment, a photocoupler 24' is provided in an I/F circuit 21 and embodied as one device having the double function of serving as a switch 23 in a bypass circuit R and as an insulating circuit 24. A CPU 25 controls a switch TR in ON/OFF fashion which is connected between the photocoupler 24 and a power source 11. With the photocoupler 24' set in the ON state, a current taken from a transmitter loop into the handheld terminal flows through a bypass circuit R. With the photocoupler 24' set in an OFF state, a current received from the transmitter loop into the handheld terminal flows through a resistor 22. CPU 25 controls the photocoupler 24' in ON/OFF fashion while passing a current through a bypass circuit R under the same conditions as those in the first embodiment.

According to the present embodiment, a power source is not required on a secondary-side coil of a transformer, thus making it possible to obtain a compact apparatus.

Third Embodiment

Figure 3:
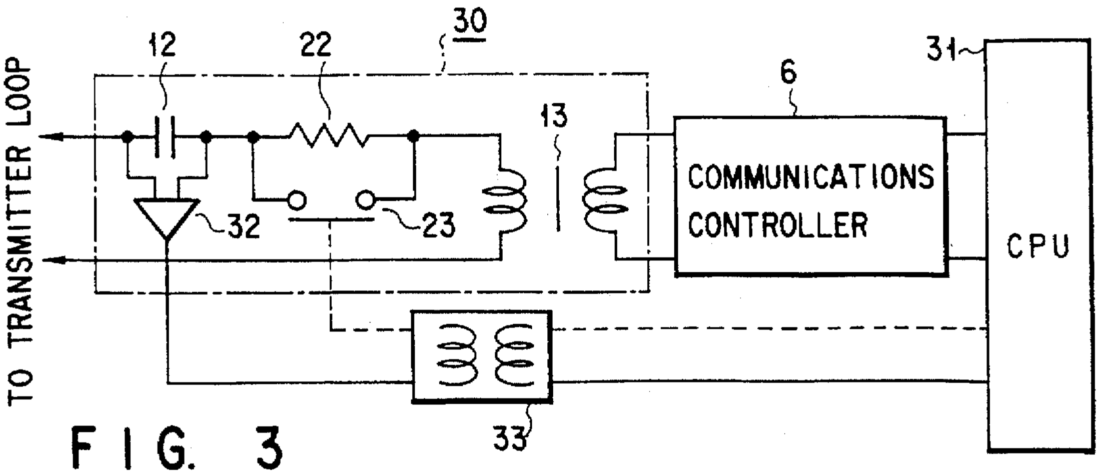
FIG. 3 is a schematic diagram showing a major part of a handheld terminal according to a third embodiment of the present invention.

FIG. 3 shows a functional block diagram of a handheld terminal according to a third embodiment of the present invention. The present embodiment is substantially the same as the handheld terminal of FIG. 1 except for an I/F circuit connected to a transmitter loop and the control function of a CPU to the I/F circuit. In this connection it is to be noted that a key-in circuit, a memory, a display section, a power source, etc., are omitted.

The handheld terminal of the present invention includes an I/F circuit 30 capable of detecting whether or not it is connected to the transmitter loop and CPU 31 controlling part of the I/F circuit 30 on the basis of a result of detection. The I/F circuit 30 has a capacitor 12 suppressing the DC component of an analog signal branched from the transmitter loop and a transformer 13 achieving insulation between the transmitter loop and a control system such as a transformer 13. A resistor 22 is inserted in series between a capacitor 12 and the transformer 13 and in parallel to a switch 23. The switch 23 is connected to CPU 31 through an insulating circuit 33.

The transmitter loop-side terminal of the capacitor 12 is connected to a first input terminal of a comparator 32 and the resistor 22-side terminal of the capacitor 12 is connected to a second input terminal of the comparator 32. The comparator 32 compares a voltage level, on one hand, between the first input terminal and the second input terminal with a reference voltage of a predetermined level on the other and delivers a connected-state signal as an output signal when the voltage level between these input terminals and reference voltage level coincide with each other in a predetermined range and a non-connected signal as an output signal when the voltage level between the input terminals and reference voltage level differ beyond that predetermined range. The output terminal of the comparator 32 is connected to CPU 31 through an insulating circuit 33.

In the present embodiment thus arranged, a voltage level near a lowest voltage on the connection areas of the transmitter loop is set as the reference voltage to the comparator 32. Here, with the handheld terminal connected to the transmitter loop, the voltage level of the capacitor 12 substantially coincides with the voltage on the connection areas of the transmitter loop. In consequence, if the voltage level on the capacitor 12 coincides with the reference voltage level in that predetermined range, the connected state can be judged as such while, on the other hand, if the voltage level on the capacitor 12 and reference level differ beyond the predetermined range, the not-connected state can be judged as such.

In a period in which the not-connected signal is input from the comparator 32, CPU 31 judges that the handheld terminal is not connected to the transmitter loop, thus sending an "open" instruction to the switch 23 so that the switch 23 is opened. In a period in which a "connected" signal is input from the comparator 32, CPU 31 judges that the handheld terminal is connected to the transmitter loop, sending a "closed" instruction to the switch 23 so that the switch 23 is closed.

In consequence, with the handheld terminal connected to the transmitter loop, the switch 23 is opened, thus restricting the peak level of a charging current or discharging current through the resistor 22. During communication, the switch 23 is closed and the resistor 22 is bypassed so that an AC component superimposed on an analog signal is prevented from being attenuated through the resistor 22.

According to the present embodiment, CPU 31 judges, based on the voltage level of the capacitor 12, whether or not the handheld terminal is connected to the transmitter loop and, even if an open/closed instruction is not input from the key-in circuit, etc., to CPU, the switch 23 can be automatically controlled in ON/OFF fashion.

Fourth Embodiment

Figure 4:
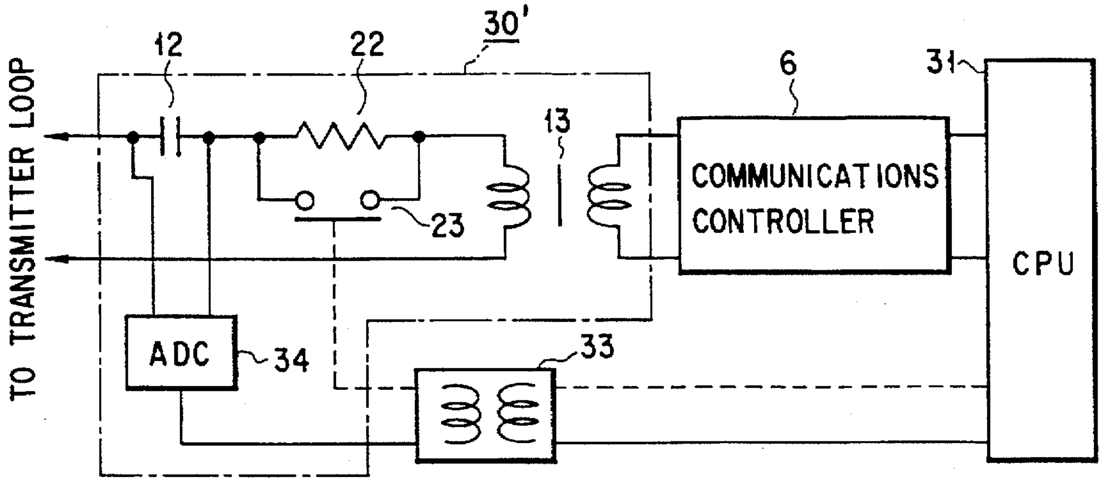
FIG. 4 is a schematic diagram showing a major part of a handheld terminal according to a fourth embodiment of the present invention.

FIG. 4 shows a functional block diagram of a handheld terminal according to a fourth embodiment of the present invention. The present embodiment includes an A/D converter 34 in place of the comparator 32 used in the third embodiment. The other arrangement is the same as that of the third embodiment.

The A/D converter 34 converts the voltage level of a capacitor 12 to a digital signal and input it to CPU 31. CPU 31 compares a capacitor voltage representing the digital signal from the A/D converter 34 with a reference voltage level and judges, based on a result of comparison, whether or not a handheld terminal is connected to a transmitter loop. A switch 23 is ON/OFF controlled under the same conditions as the previous embodiment.

Fifth Embodiment

Figure 5:
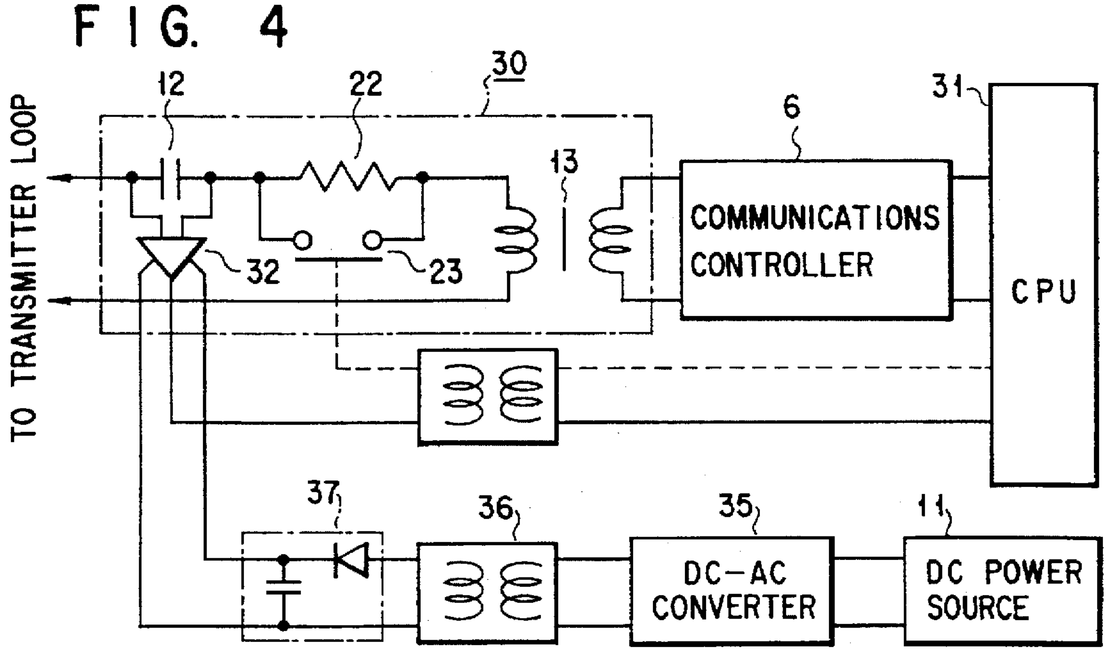
FIG. 5 is a schematic diagram showing a major part of a handheld terminal according to a fifth embodiment of the present invention.

FIG. 5 shows a functional block diagram of a handheld terminal according to a fifth embodiment of the present invention. The present embodiment is basically the same as the handheld terminal of the third embodiment and a practical DC power source 11 serves also as a power source for a comparator 32. That is, a DC current from a DC power source 11 is converted by a DC-AC converter 35 to an AC current and the AC current is supplied through a transformer 36 to a rectifier circuit 37 where the AC current is converted to a DC current. The DC current of the rectifier circuit 37 is supplied to the comparator In the preceding third to fifth embodiments, a bypassing switch and an insulating circuit in the I/F circuit can be constructed of a photocoupler, such as PHOTO MOS COUPLER, as in the second embodiment, the insulating circuit achieving insulation between the switch and CPU.

Sixth Embodiment

Figure 6:
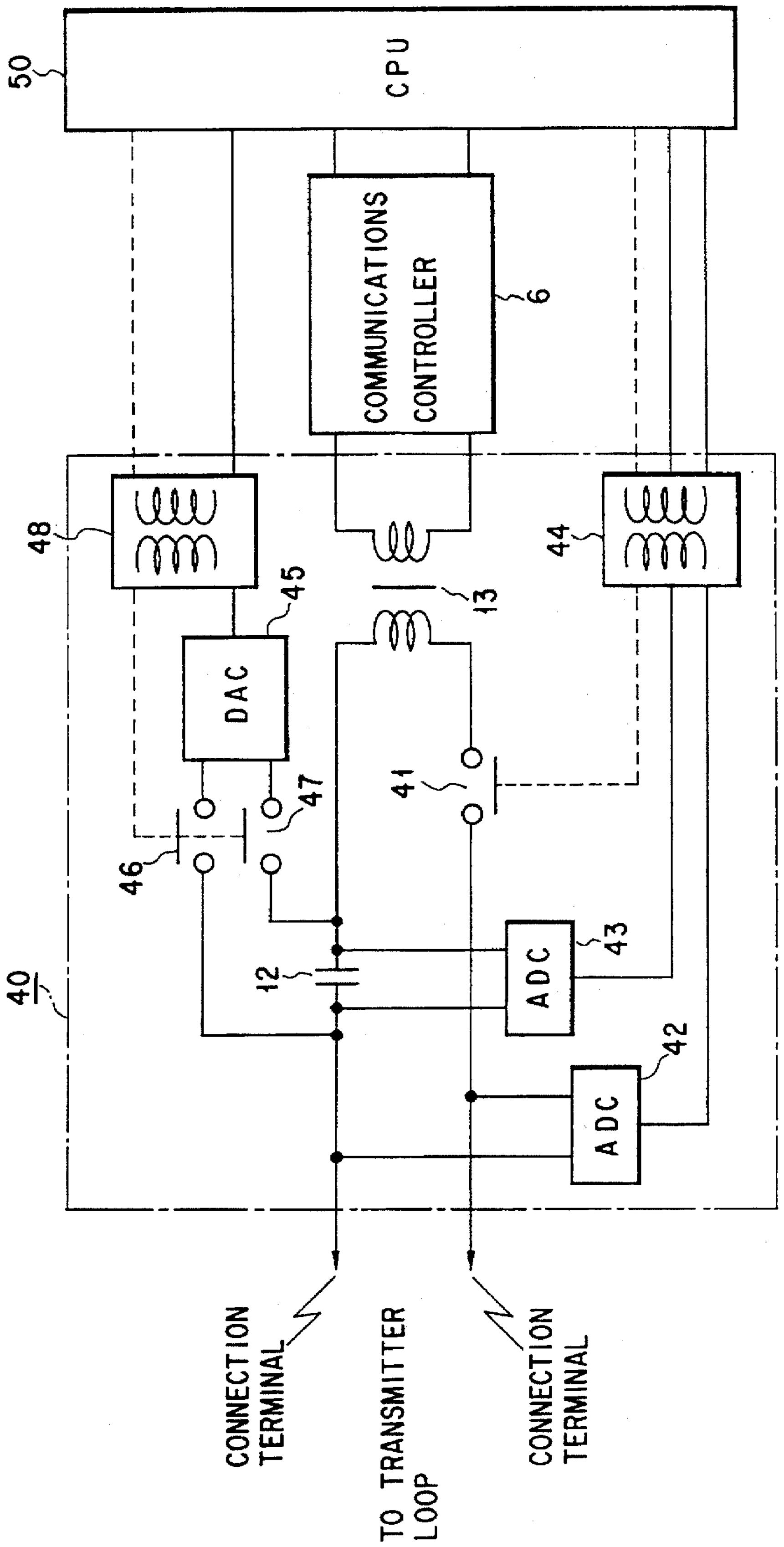
FIG. 6 is a schematic diagram showing a major part of a handheld terminal according to a sixth embodiment of the present invention.
Figure 7:
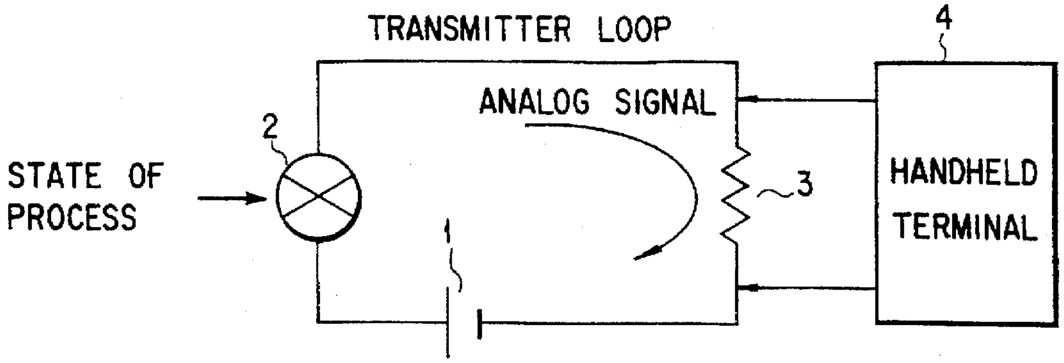
FIG. 7 PRIOR ART
FIG. 7 shows a state in which the handheld terminal is connected to a transmitter loop.

FIG. 6 shows a functional block diagram of a handheld terminal according to a sixth embodiment of the present invention. The present embodiment is the same as that in FIG. 1, except for an I/F circuit connected to a transmitter loop and the control function of a CPU to control the I/F circuit.

The present embodiment has the I/F circuit 40 controlling a voltage of a capacitor 12 to the same level as that on control areas of the transmitter loop and CPU 50 having the function to control a capacitor voltage of the I/F circuit 40.

The I/F circuit 40 includes that capacitor 12 suppressing a DC component of an analog signal branched from the transmitter loop, a transformer 13 for achieving insulation between the transmitter loop and a control system, such as CPU 50, and a switch 41 shutting off a connection between a connection terminal to the transmitter loop and a transformer 13.

Both the connection terminals of the I/F circuit 40 are connected to the corresponding terminals of an A/D converter 42. The A/D converter 42 can measure a connection terminal-to-connection terminal voltage to obtain a digital signal for delivery as an output. Further, both the terminals of the capacitor 12 are connected to the A/D converter 43 and a capacitance voltage is measured across the capacitor 12 and, by doing so, a digital signal is delivered as an output. The A/D converters 42 and 43 are connected to CPU 50 through an insulating circuit 44 composed of a transformer.

Both the terminals of the capacitor 12 are connected to a D/A converter 45. Switches 46 and 47 are inserted between a D/A converter 45 and both the ends of the capacitor 12 so as to be shut off there. The D/A converter 45 is connected to CPU 50 through an insulating circuit 48 composed of a transformer.

The operation of the present embodiment thus arranged will be explained below.

The respective switches 41, 46 and 47 are placed in an open state before being connected to the transmitter loop.

Then the connection terminals of the I/F circuit 40 is connected to the transmitter loop. At this time, a voltage on the connection terminal areas of the A/D converter 42, that is, a voltage on the connection areas of the transmitter loop are read out by CPU 50 (step 1).

CPU 50 enables the same voltage as that read out at step 1 to be generated at the D/A converter 45 and the switches 46 and 47 to be closed. With the switches 46 and 47 so closed, the potentials emerging from the D/A converter 45 are applied to the associated ends of the capacitor 12 to allow the capacitor to be charged (step 2).

On the other hand, the charging voltage of the capacitor 12 is measured by the A/D converter 43 and monitored by CPU 12. CPU 50 enables the switches 46 and 47 to be opened, when the charging voltage 12 across the capacitor 12 coincides with a voltage on the connection terminals of the transmitter loop, and the switch 41 to be thrown ON to make connection to the transmitter loop.

According to the present embodiment, after the capacitor 12 of the I/F circuit 40 has been charged to the same voltage as that on the connection terminals of the transmitter loop, the capacitor 12 is connected to the transmitter loop. Since, therefore, there is no voltage difference between the transmitter loop and the capacitor 12, the charging current or discharging current does not flow there and hence there is no adverse influence on an analog signal flowing in the transmitter loop.

In the respective embodiments and variants, a loop may be provided for discharging the capacitor Although the present invention has been explained in conjunction with the handheld terminal, it can be applied to other types of communications apparatus so long as they are composed of those adapted to conduct two-way communication with a signal superimposed onto an analog signal of the transmitter loop.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A communication apparatus, connected to a transmitter loop having a load resistor to which a field device sends an analog signal corresponding to a processing amount, for superimposing an AC signal representative of communication data on the analog signal so as to transmit the communication data to the field device, and for separating an AC signal component superimposed on the analog signal by the field device from the analog signal flowing in the transmitter loops o as to receive the AC signal component as a communication data from the field device, comprising:

a branching loop connected in parallel with the load resistor so as to branch the analog signal flowing in the transmitter loop to the branching loop;

a capacitor inserted in the branching loop, for preventing a DC signal component in the analog signal branched from the transmitter loop into the branching loop and being passed through an AC signal component in the analog signal;

charging/discharging controlling means for controlling a charging current produced through a charging of the capacitor and a discharging current produced through a discharging of the capacitor; and communication means for receiving the AC signal component, which is passed through the capacitor, as the communication data from the field device and for applying to the branching loop the AC signal representative of the communication data to allow communication with the field device and superimposing the AC signal on the analog signal flowing in the transmitter loop.

2. The communications apparatus according to claim 1, wherein the charging/discharging control means comprises a resistor inserted in series array in the branching loop, a bypass circuit connected in parallel with the resistor, and a switch provided in the bypass circuit.

3. The communications apparatus according to claim 2, wherein the switch is turned off before the branching loop is connected to the transmitter loop and turned on when a difference between a voltage on the capacitor and a voltage on those connection point between the branching loop and the transmitter loop is in a predetermined range.

4. The communications apparatus according to claim 2, further comprising switch changeover means for electrically changing the switch and insulating means for insulating between the switch and the switch changeover means, the switch changeover means and insulating means being comprised of a photocoupler.

5. The communications apparatus according to claim 1, further comprising a comparator for comparing a voltage on the capacitor with a predetermined reference voltage and for delivering a connected signal representing a connection to the transmitter loop when the voltage on the capacitor and predetermined reference voltage coincide with each other in a predetermined range and a not-connected signal representing no connection to the transmitter loop when the voltage on the capacitor and predetermined reference voltage do not coincide with each other in the predetermined range.

6. The communications apparatus according to claim 5, further comprising a DC-AC converter for converting a DC current coming from a DC power source to an AC current, a rectifier circuit for rectifying the AC current from the DC-AC converter and supplying the rectified current to the comparator, and an insulating circuit for achieving insulation between the DC-AC converter and the rectifier circuit.

7. The communications apparatus according to claim 5, the charging/discharging controlling means comprises a resistor inserted in series array into the branching loop, a bypass circuit connected in parallel with the resistor, a switch provided in the bypass circuit, and switch changeover means for turning the switch OFF during a period in which the comparator delivers the not-connected signal and for turning the switch ON during a period in which the comparator delivers the connected signal.

8. The communications apparatus according to claim 7, further comprising insulating means for achieving insulation between the switch and the switch changeover means, the switch changeover means and insulating means being comprised of a photocoupler.

9. The communications apparatus according to claim 1, further comprising an A/D converter having analog input terminals across which the voltage of the capacitor is applied and a digital output terminal from which the voltage applied across the analog input terminals are output as a digital signal represented in predetermined bits.

10. The communications apparatus according to claim 9, in which the charging/discharging means comprises a resistor inserted in series array into the branching loop, a bypass circuit connected in parallel with the resistor, a switch provided in the bypass circuit, and switch changeover means for achieving switching on the basis of the digital signal which is output from the A/D converter.

11. The communications apparatus according to claim 10, further comprising insulating means for achieving insulation between the switch and the switch changeover means, the switch changeover means and insulating means being comprised of a photocoupler.

12. The communications apparatus according to claim 1, wherein the charging/discharging controlling means comprises connection terminal voltage detecting means for detecting a voltage on those connection terminals between the branching loop and the transmitter loop, a charging/discharging circuit for making the voltage detected on the connection terminal voltage detecting means and voltage on the capacitor equal to each other, and a switch inserted into the branching loop.

13. The communications apparatus according to claim 12, wherein the charging/discharging circuit comprises capacitor voltage detecting means for detecting the capacitor voltage, a D/A converter having one pair of analog terminals connected across both the terminals of the capacitor, and means for applying, to the digital terminal of the D/A converter, a digital signal for making the voltage detected by the connection terminal voltage detecting means and voltage detected by the capacitor voltage detecting means equal to each other.

14. A communications apparatus, connected to a transmitter loop which a field device sends an analog signal corresponding to a processing amount, with for superimposing an AC signal representative of communication data on the analog signal to transmit the communication data to the field device, and separating an AC signal component superimposed on the analog signal by the field device from the analog signal flowing in the transmitter loop to receive the AC signal component as a communication data from the field device, comprising:

a branching loop connected in parallel with a load resistor inserted in the transmitter loop and branching the analog signal flowing in the transmitter loop;

a capacitor inserted in the branching loop, for preventing a DC signal component in the analog signal branched from the transmitter loop into the branching loop and being passed through an AC signal component in the analog signal;

communication means for receiving the AC signal component, which is passed through the capacitor, as the communication data from the field device and for applying to the branching loop the AC signal representative of the communication data to allow communication with the field device and superimposing the AC signal on the analog signal flowing in the transmitter loop; and connection detecting means for detecting the voltage on the capacitor and for detecting, based on the detected voltage of the capacitor, that the branching loop is connected to the transmitter loop.

15. The communications apparatus according to claim 14, further comprising a resistor inserted in series array into the branching loop, a bypass circuit connected in parallel with the resistor, a switch provided in the bypass circuit, and switch changeover means for turning the switch OFF until the connection detecting means detects that the branching loop is connected to the transmitter loop and for turning the switch ON when the connection detecting means detects that the branching loop is connected to the transmitter loop.

16. The communications apparatus according to claim 15, further comprising insulating means for achieving insulation between the switch and the switch changeover means, the switch changeover means and insulating means being comprised of a photocoupler.

17. A communications apparatus, connected to a transmitter loop which a field device sends an analog signal corresponding to a processing amount, with for superimposing an AC signal representative of communication data on the analog signal to transmit the communication data to the field device and separating an AC signal component superimposed on the analog signal by the field device from the analog signal flowing in the transmitter loop to receive the AC signal component as a communication data from the field device, comprising:

a branching loop connected in parallel with a load resistor inserted in the transmitter loop and branching the analog signal flowing in the transmitter loop;

a capacitor inserted in the branching loop to preventing a DC signal component in the analog signal branched from the transmitter loop into the branching loop and being passed through an AC signal component in the analog signal;

communication means for receiving the AC signal component, which is passed through the capacitor, as the communication data from the field device and for applying to the branching loop the AC signal representative of the communication data to allow communication with the field device and superimposing the AC signal on the analog signal flowing in the transmitter loop;

connection terminal voltage detecting means for detecting a voltage on those connection areas between the branching loop and the transmitter loop; and capacitor charging/discharging means for charging/discharging the capacitor so as to make the voltage detected by the connection terminal voltage detecting means and voltage of the capacitor equal to each other.

* * * * *